United States Patent [19]

Carstensen

[11] Patent Number: 4,875,713

[45] Date of Patent: Oct. 24, 1989

[54] INTERNALLY COATED TUBULAR SYSTEM

[75] Inventor: Kenneth J. Carstensen, 4540 N. 44th St. No. 70, Phoenix, Ariz. 85018

[73] Assignee: Kenneth J. Carstensen, Phoenix, Ariz.

[21] Appl. No.: 171,157

[22] Filed: Mar. 17, 1988

Related U.S. Application Data

[63] Continuation of Ser. No. 779,636, Sep. 24, 1985, abandoned.

[51] Int. Cl.$^4$ ............................................. F16L 58/10
[52] U.S. Cl. .................................. 285/55; 285/332.3; 285/334; 285/334.3
[58] Field of Search ................. 285/55, 333, 334, 355, 285/390, 379, 332.2, 332.3, 334.3, 334.2, 909, 910, 383; 277/70, 178, 207 A, 208, 183, 184

[56] References Cited

U.S. PATENT DOCUMENTS

| | | | |
|---|---|---|---|
| 2,110,127 | 3/1938 | Hinderliter | 285/332.2 |
| 2,187,798 | 1/1940 | Texter | 285/390 |
| 2,204,754 | 6/1940 | Frame | 285/334 |
| 2,669,465 | 2/1954 | Newell | 285/334.3 |
| 2,754,136 | 7/1956 | Phillips | 277/70 |
| 2,793,884 | 5/1957 | Jungblut | 285/333 |
| 2,915,322 | 12/1959 | Dunlop | 285/333 |
| 3,054,628 | 9/1962 | Hardy et al. | 285/379 |
| 3,266,821 | 8/1966 | Safford | 285/55 |
| 3,339,945 | 9/1967 | McCrory et al. | 285/55 |
| 3,489,437 | 1/1970 | Duret | 285/55 |
| 3,544,119 | 12/1970 | Glover | 277/207 A |
| 3,572,777 | 3/1971 | Blose | 285/334 |
| 3,586,353 | 6/1971 | Lorenz | 285/390 |
| 3,600,045 | 8/1971 | Inoue | 277/178 |
| 4,127,927 | 12/1978 | Hauk et al. | 285/333 |
| 4,319,775 | 3/1982 | Bennett | 285/383 |
| 4,337,956 | 7/1982 | Hopper | 277/70 |
| 4,508,375 | 4/1985 | Patterson et al. | 285/334 |
| 4,509,776 | 4/1985 | Yoshida et al. | 285/55 |
| 4,537,428 | 8/1985 | Landriault | 285/333 |
| 4,549,754 | 10/1985 | Saunders et al. | 285/334 |
| 4,568,113 | 2/1986 | Axford et al. | 285/55 |
| 4,712,815 | 12/1987 | Reeves | 285/334 |

FOREIGN PATENT DOCUMENTS 542062 1/1977 U.S.S.R. ............................ 285/334.2

Primary Examiner—Randolph A. Reese
Assistant Examiner—Anthony Knight
Attorney, Agent, or Firm—Merchant, Gould, Smith, Edell, Welter & Schmidt

[57] ABSTRACT

A coupling for tubings or casings having internal corrosion resistant coatings comprises a pair of tubular members having upset ends, together with outer reference shoulders and threaded regions including low profile, shallow taper threads. A collar of a length related to the reference shoulder positions is engaged against both, and in such positions the ends of the tubular members compress opposite sides of an elastomeric seal that is fitted over an integral central ring in the collar, and that is engaged by side tapers at the nose ends of the tubular members. The seal conforms to the nose ends in a fashion that insures continuity in the corrosion resistant coating while also providing a barrier against electrolytic action.

6 Claims, 4 Drawing Sheets

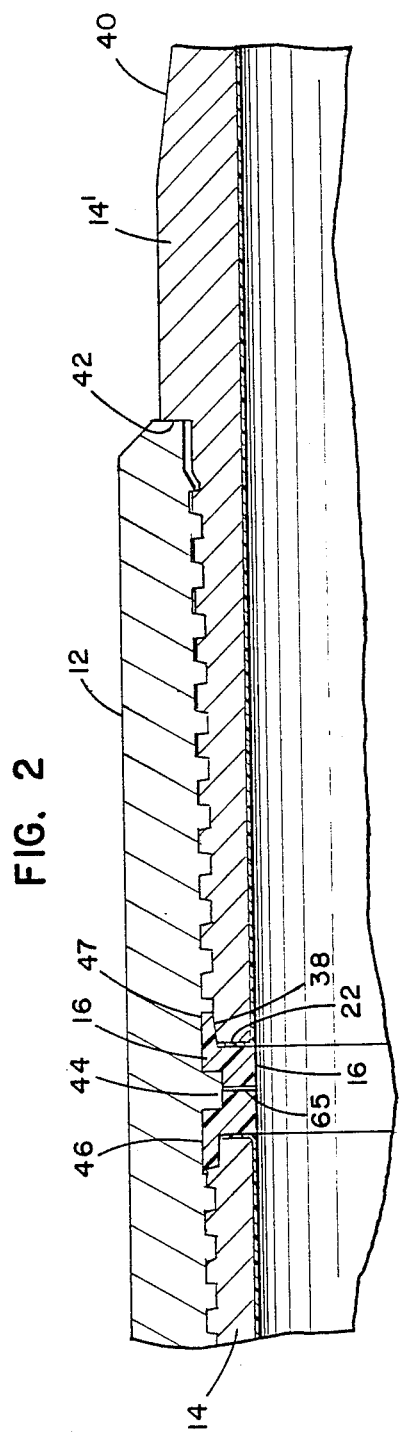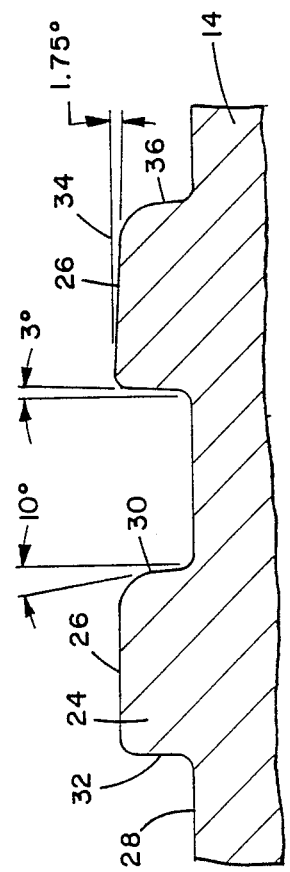
FIG. 2
FIG. 3

INTERNALLY COATED TUBULAR SYSTEM

This is a continuation of co-pending application Ser. No. 779,636 filed on Sep. 24, 1985 now abandoned.

BACKGROUND OF THE INVENTION

This invention relates to internally coated, threaded end, tubular goods, and more particularly to tubular products such as pipe, tubing, casing and the like used in corrosive environments in the oil and gas drilling and production industries.

It has long been common practice where corrosive environments are encountered in the oil and gas industries to use internally coated tubular elements and collars, so as to avoid contact between the corrosive gases and liquids and the metal surfaces. The coating materials and processes are costly, but despite constant development and careful control minute defects in the plastic coating still cause excessive problems. For example, pinholes, fracture points and protruding metallic whiskers can be present that act as sites for attack by the corrosive materials. The most frequent and troublesome problems, however, arise at the nose ends of inserted pins. Internal coating machinery cannot thoroughly cover the nose end of the pipe without special adaptation. In any event any sharp corner, junction or discontinuity between two different surfaces presents a weak point in the coating system. In practice, coated tubular goods taken from a well after prolonged exposure are very often found to have been significantly corroded, even substantially eaten away, at the nose ends.

In the oil and gas industry any defect that can serve as a corrosion side in a coated tubular product is referred to as a "holiday". The search for "holiday free" processes and products has been continuous but has not resolved the pin end corrosion problem. For the interior body of a tubing or casing, electrical inspection equipment passed through the product can sensitively respond to pinholes, apertures and protruding metal points. While the coating may have to be removed so that a new surface can be applied when a defect has been detected, there is a degree of assurance available. The same is not true of the problems that arise at ends and corners, however. Here the physical discontinuities and the need for secure makeup when threading together may be the cause of a break in the coating, as may be a thin or non-adhering area at the corner or end.

An important reason that seals, rings or other added elements in abutment with the nose ends have not been satisfactory derives from other requirements or conditions. For example, wall thickness, particularly in the threaded region of the pin, must be sufficient to withstand the tensile and circumferential stresses induced when using long strings in high pressure internal or external conditions. In the makeup of couplings, some cone distortion results from the high interference levels applied and this initial radial stress limits what can be resisted from other sources. Moreover, the makeup problem also affects the designs that can advantageously be used with coated pipe. Even if torque measuring equipment is used, with the attendant slowing of the makeup sequence at considerable expense, corrosion problems arise from inadequate or excessive bearing pressures. Not the least of these problems arises from the fact that excessive forces and pressures can introduce local deformations that coatings cannot follow without cracking.

A technique used in certain couplings for reduction of electrolytic corrosion is worthy of note here, as evidencing an attempted solution for a different problem. Where the confined gases and liquids have electrolytic properties they can fill the space between pipe ends and produce a galvanic cell that causes pipe end corrosion. Therefore, workers in the art have placed corrosion barrier rings between the opposed pipe ends, compressing the rings during makeup but interposing an insulative gap. In one form these rings have planar side faces, and in another they include lips that fit under the side taper adjacent the pipe nose. Neither configuration has been much used in practice, probably because they both tend to become compressed from the ends so as to protrude into the fluid stream, which pulls them out. They also interface with tools that must be lowered into and retrieved from the well bore. It is difficult to control coupling makeup so that the corrosion barriers, which are not sealing elements, are not unduly distorted. The seal elements can be permeated slowly by gases during operation under high pressure, creating limited volume traps against the tube wall. If the interior is suddenly depressurized, the resultant differential pressure forces the seals inwardly into the interior and at times even results in explosive decompression of the seal or barrier material.

SUMMARY OF THE INVENTION

A system in accordance with the invention for reliable makeup and holiday free coupling of internally coated tubing or casing includes a power thread configuration, such as a shallow taper buttress thread in upset tubing ends. The tubing sections each have a reference shoulder outside the threaded region, at a predetermined spacing from the nose end, so that the pipes can be threaded in only to a limit position. A stiffly resilient seal ring between the nose ends is compressed a predetermined amount between the nose ends when the sections are at the limit positions, because of the axial length of the collar abutting the shoulders. The seal ring is locked into position by a conforming relationship between an integral central ring on the collar and a mating circumferential groove on the seal. In addition, tapered inside flanges on the seal ring mate with side tapers on the pin noses. The pin end starting threads can tap into these flanges. The upset pipe ends, the shallow thread taper, and a low profile thread height combine to maintain adequate wall thickness to withstand cone distortion, bearing pressures and tensile loads. The controllably compressed seal ring matingly engages the nose ends of the opposed tubing sections and provides smooth junctions at the inside corners, without restricting the inner diameter. In addition, a continuous erosion resistant internal profile is provided without overstressing the plastic coating on the nose end or at the corners. The seal ring also electrically isolates the opposing pin ends, minimizing electrolytic action. The positional relationship between the reference shoulders and the length of the collar permits easy makeup in the field, with controlled seal ring compression, because section lengths can be added merely by threading in to the limit position. In addition, to prevent displacement of the seal ring by gas accumulations derived from slow gas permeation through the elastomers, which result in explosive decompression, small radial apertures are incorporated in the seal ring. These apertures are closed under the compression of the opposed nose ends. If there is sudden depressurization of the pipe, accumulations of permeated gases are instantaneously released to prevent a pressure differential from forcing the seal ring inwardly. Another feature of the invention is a method for inserting and retaining the seal ring in position during makeup.

BRIEF DESCRIPTION OF THE DRAWINGS

A better understanding of the invention may be had by reference to the following description, taken in conjunction with the accompanying drawings, in which:

FIG. 2 is a side sectional view of a portion of the coupling system of FIG. 1;

FIG. 3 is an enlarged cross-sectional view of a fragment of the threaded position of a pipe used in the arrangement of FIGS. 1 and 2;

DETAILED DESCRIPTION OF THE INVENTION

A "holiday free" coupling in accordance with the invention, referring now to FIGS. 1-5, utilizes a power thread configuration of a novel type, a specially adapted collar 12 and engaged tubing sections 14, 14' and an interior stiffly resilient seal ring 16, all configured so as to provide a needed balance of structural and sealing characteristics as well as operative reliability and ease of use. A multitude of factors have been taken into account in achieving a field useful, non-galling, high tensile load coupling while insuring a high integrity corrosion resistant internal surface. Critical physical and operative limits are not exceeded, or even approached, in any respect. The manner in which this balance has been achieved will be evident from the following description.

Figure 6:
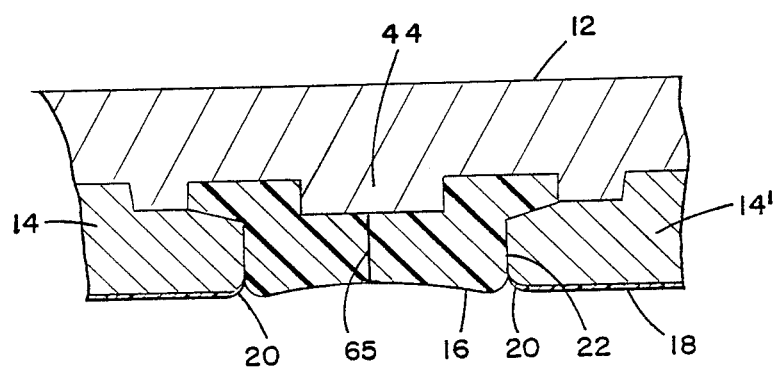
FIG. 6 is an enlarged fragmentary view of a corner section of seal ring and pin, showing the relation of seal ring to coating at pin end and end corner.

The tubing sections 14, 14' may be pipe, casing or other tubular goods used for oil or gas development wells or production. Although the coupling may obviously be used in a wide variety of applications in which corrosive gases or liquids are to be transported, the present examples relate to the oil and gas industry because of the criticality and scope of the problems involved. The specific example here is that of two pipes pins 14, 14' of a typically used size, say 2⅜ to 4½" diameter. The pipes are each internally coated with a layer 18 of plastic such as phenolics, modified phenolics, epoxy polyamides, or epoxy modified phenolics, all of which are used in down hole plastic coatings. The pipes 14, 14' are coated by an internal spray process and then cured at temperature before inspection. As best seen in FIG. 6, the spray technique leaves an overspray portion 20 that covers the corner and at least a part of the pipe nose 22. This nose and corner region is particularly sensitive to underlying voids or other imperfections because of the geometrical transition, and it also can readily be damaged by contact with other elements during storage, transport or use.

Each pipe section 14, 14' incorporates a male threaded portion in the specific form of a low root and tooth profile buttress thread having a shallow taper and 5 threads per inch. As seen in the side section view of FIGS. 2 and 3, the teeth 24 have a crest surface 26 of predetermined (here 0.040") height relative to the root surface 28, a stab flank 30 on the entry side (relative to the collar 12) and a load flank 32 on the load bearing side. The stab flank 30 is at an angle of 10° relative to a perpendicular to the pipe 14, 14' axis, while the load flank is at 3° to the vertical. The crest surface 26 tapers with 1.75° fall off 34 between the midregion of the crest and the stab flank 30, where there is a corner radius 36 of about 0.020". At the nose end of each pipe 14, 14' there is a 15° taper 38 relative to the pipe axis, this taper 38 having no effective amount of plastic coating.

Each pipe 14, 14' has an upset terminal portion 40, as is often employed with power threads to provide more wall thickness in the threaded region. The upset portion 40 includes a reference shoulder 42 at a chosen distance from the nose end 22. By way of example, the shoulder 42 to nose 22 spacing is 2.6" for a 2⅜ pipe. The length of the collar 12 is 5.50" in this example. The reference shoulder 42 does not introduce a meaningful stress riser because it is at the beginning of the threaded region, where the pipe 14, 14' is thickest. In the threaded portion of the upset end 40, the taper employed is 0.040" per inch, which is substantially less than the 0.0625" per inch heretofore used as the virtual standard for buttress thread in the petroleum industry. Thus, there is substantial wall thickness at the nose end 22 as well, so that substantial bearing pressures and tensile loads can be accommodated with lower resulting stresses and closely controlled deformations. The collar 12 includes a complementary thread configuration, mating with a close fit as described in the recently filed application of the present inventor entitled "Threaded Tubing and Casing Joint", Ser. No. 726,605, filed Apr. 24, 1985. Further aspects and advantages of the thread configuration per se may be appreciated by reference to the aforementioned application.

In the present instance, however, the collar 12 also includes a central interior locking ring 44 of no greater height than the crests of the threads on the collar. Grooves 46, 47 are disposed on each side of the locking ring 44 for conformity to the seal ring 16.

Figure 1:
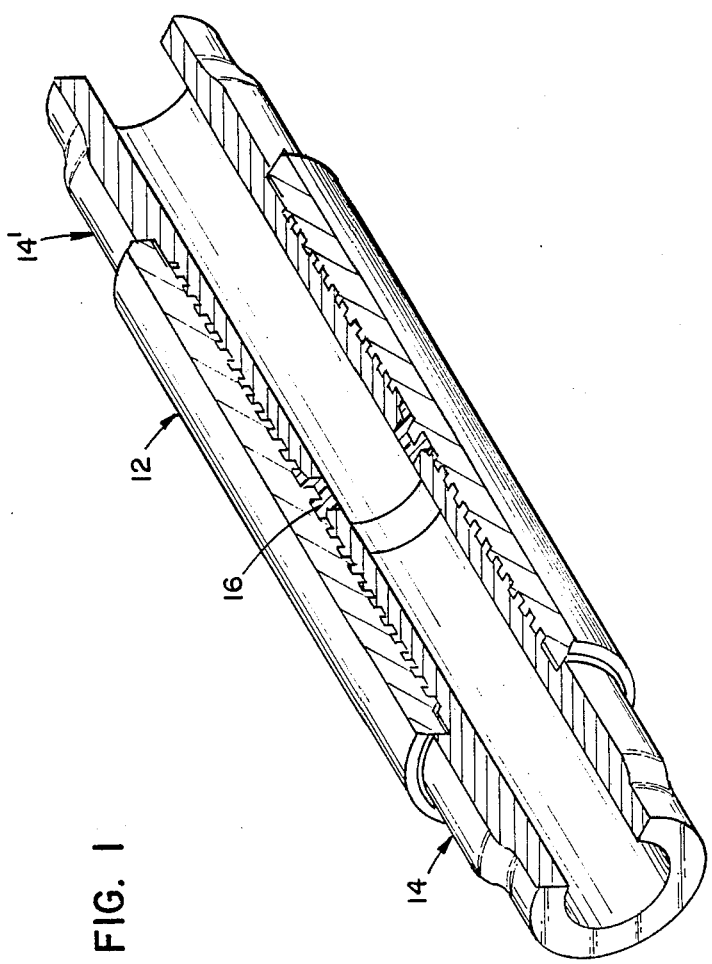
FIG. 1 is a perspective view, partially broken away, of a coupling system in accordance with the invention.
Figure 4:
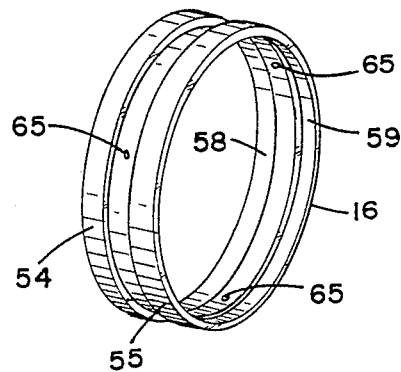
FIG. 4 is a perspective view of a seal ring used in the arrangement of FIGS. 1 and 2.
Figure 5:
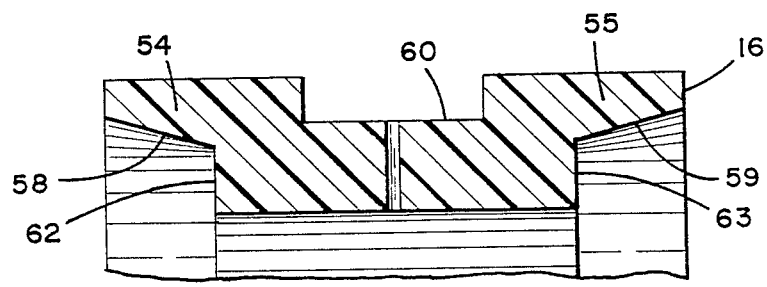
FIG. 5. is a side sectional view of a portion of an undistorted seal ring in accordance with FIG. 4.

Referring specifically to FIGS. 4 and 5, the seal ring 16 is a stiffly resilient, corrosion resistant member of a particular cross-section. Although other materials may be utilized it is particularly advantageous, for a combination of physical and operative properties, to employ a fiber reinforced polytetrafluoroethylene (P.T.F.E.) composite. In the preferred example the ring 16 has in excess of 75% P.T.F.E., 5% glass fibers and 5% graphite fibers. This formulation may be deformed adequately, under moderate heat, for insertion, then assumes the desired shape when compressed after insertion and remains locked in place. It also may be heated to be softened and has a shape memory (a tendency to return to initial shape) when cooled.

The seal ring 16 has edge flanges 54, 55 at its outer diameter, the inner diameter sides 58, 59 of these flanges being tapered at the same angle (15%) as the taper at the tubing nose end. The outer diameter surface of the ring 16 includes a circumferential groove 60 mating with the locking ring 44 as the adjacent surface fill the grooves 46, 47 in the collar 12 wall. At the inner surface, the central body of the seal ring 16 has an inner diameter corresponding to that of the tubing, with spaced apart side shoulders 62, 63 intersecting with the edge flanges 54, 55. The spacing between the side shoulders 62, 63 is selected to place the entire seal ring 16 under compression when the tubing sections 14, 14' are fully inserted.

Small radial apertures 65 extend through the central body of the seal ring 16 at three symmetrically placed positions. These apertures 65, here of 0.015" diameter, are sufficiently small to close under compression, but open to provide escape paths for gases if there is substantial differential pressure, as is described below.

Figure 7:
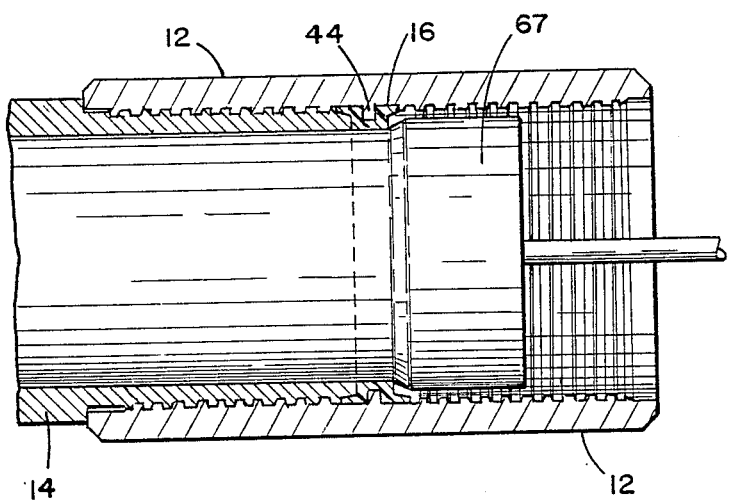
FIG. 7 is a cross-sectional view of a coupling showing how the seal ring and one pin may be assembled.

As shown in the successive stages depicted in FIG. 7, in a first step, the ring 16 is deformed adequately to be fitted within the collar 12, with the outer groove 60 mating with the locking ring 44. Preferably the ring 16 is first softened in hot water of 120° F. for insertion. In the next step, a stub member 67, threaded or otherwise firmly seated, is inserted against the opposite side of the seal 16 to prevent displacement of the seal 16 as the first pin 14 or 14' is threaded in until reference shoulder 42 on the upset end 40 firmly engages the collar 12 end. At this position, the side taper on the nose portion end of the pin 14 wedges down on the side taper 58 and taps the starting thread into the seal 16. The nose end 22 itself bears against the side shoulder 62. The stub member 67 is then removed. Usually, the collar 12 with one pin 14 attached is stored at a field site until needed. The coupling is completed, as at a drill rig by threading in the other pin 14'. Proper makeup is assured simply by engaging the shoulder on the second pin 14' against the adjacent end of the collar 12, which action also compresses and energizes the seal 16 from the second side.

In this example, the sides 62, 63 of the seal 16 are compressed approximately 0.010", which deforms the seal in the manner best seen in the enlarged view of FIG. 5. Because the tapered sides 58, 59 of the flanges 54,55 are compressed and secured in place, and because the locking ring 44 conforms to the nose ends of the pins 14, 14', the edges of the side shoulders 62, 63 of the annulus 60 spread outwardly and toward the adjacent pin nose corners, registering forcefully against the area of plastic coating on the nose end. This action introduces a slight concavity (best seen in FIG. 6) in the central portion of the seal 16, which nonetheless is essentially flush with the inner diameter of the pins. Consequently, internal gases can pass smoothly at high velocity through the coupling, which presents a constant inner diameter with the remainder of the coupling. The seal ring 16 presses uniformly and conformingly on the plastic nose end coating, eliminating any tendency to damage the coating. Additionally, the seal 16 acts as an insulator which prevents electrolytic action between the opposed pin 14, 14' ends. The starting threads on the pin ends tap into the flanges 54, 55 somewhat, compressing and activating the seal. As long as the loads are not so high as to crush the material it will recover and can be reactivated by retapping on the next use.

As previously noted, the different aspects of structure, physical properties and operational use cannot be treated separately. The positional references provided by the reference shoulders 42, on the tubing 14, 14', for example, determine both the bearing pressure of the threaded connections and the degree of compression of the interposed seal ring 16. Despite the reduction of wall thickness at the reference shoulders, the upset pipe ends and the shallow thread tapers provide adequate wall thickness throughout internal pressures and tensile loads.

The radial apertures 65 through the seal ring 16 function to eliminate a potential problem that arises from slow gas permeation through the elastomeric material over a long period of time. High pressure gases, such as $CO_2$, can permeate through the seal in a long (28 day) test, and effectively pressurize the space between the outer diameter of the seal ring 16 and the facing surface of the collar 12. The compressed seal ring 16 and high pressure conditions act to close the apertures, 65 against liquids and gases, but the permeation is unavoidable with useful compressible materials. No problem is presented while the coupling is under differential pressure, but one can arise if the internal pressure is suddenly relieved. In this event, however, the seal 16 flexes slightly outwardly, opening the apertures 65 sufficiently to relieve the low volume but high pressure permeated gases. Three 0.015" apertures symmetrically placed, each provide adequate drainage of pressurized gas from the surrounding area. The seal ring 16, which can sometimes be forced out of its position, therefore is held in position during rapid decompression as the leakage paths are created.

Other aperture shapes, including apertures having a larger (0.052) diameter along half of the length at the outer side, have been employed successfully but appear to be of less general application. It will be appreciated that the number of apertures and their size will vary in relation to the differential pressure to be encountered, the length of usage, the type of material employed and the size of the tubing or casing.

While various forms and modifications in accordance with the invention have been described, it will be appreciated that the invention is not limited thereto but encompasses all variations and expedients within the scope of the appended claims.

What is claimed is:

1. A coupling assembly for joining tubular goods, comprising:

a pair of tubular elements to be coupled together, each of said tubular elements terminating at nose ends, reference shoulders disposed on said elements and spaced from said nose ends, a plurality of male threads disposed on said elements between said nose ends and said reference shoulders;

a coupling collar for coupling said pair of tubular elements, said collar and said elements comprising a coupled assembly, said collar including female threads selected to threadedly receive said male threads and hold said tubular elements in coaxial alignment, said collar having an axial length selected for axial ends of said collar to abut said reference shoulders and maintain said nose ends in opposing spaced apart relation of predetermined distance;

opposing surfaces of said nose ends and said collar defining a circumferential groove;

a seal ring sized to be received within said groove, opposing surfaces of said ring and said coupled assembly defining an interface in which a gas may collect, said ring disposed between said interface and an interior of said coupled assembly;

normally closed apertures connecting said interface and said interior in normally closed gas flow communication, said apertures responsive to a pressure drop within said interior to open said gas flow communication to thereby relieve a pressure differential between said interface and said interior, said apertures including at least one aperture extending through a radial dimension of said seal ring and connecting said interface and said interior in gas flow communication, said ring selected to have an axial dimension greater than said predetermined distance, said ring disposed within said circumferential groove with said nose ends urging against said ring, aperture defining surfaces of said ring resiliently deformed into face-to-face aperture closing contact in at least partial response to said urging, said ring further selected for pressure of a gas within said interface to act against said urging to open said aperture in response to a pressure drop within said interior.

2. A coupling system according to claim 1 wherein said ring includes a central body disposed between said opposing nose ends, said body having a pair of edges extending axially from opposite axial faces of said body; each of said face ends having nose tapers on exterior surfaces thereof, said nose tapers and opposing surfaces of said collar defining a pair of annular chambers extending from said circumferential groove, said ring sized for said pair of edges to be received within said pair of annular chambers and with said edges having tapered faces conformed to mate with said nose tapers in gas sealing engagement.

3. A coupling system according to claim 2 wherein said collar includes a circumferential ring protruding into said groove, said body having an outer circumferential groove disposed to receive said circumferential ring.

4. A coupling assembly according to claim 1 wherein said ring is formed of material permeable to at least certain pressurized gases.

5. A coupling assembly for joining tubular goods, comprising:
   a pair of tubular elements to be coupled together, each of said tubular elements terminating at nose ends;
   a coupling collar for coupling said pair of tubular elements, said collar and said elements comprising a coupled assembly, attachment means for coupling said tubular elements with said collar for said collar to hold said tubular elements in coaxial alignment with said nose ends maintained in opposing spaced apart relation of predetermined distance, said attachment means including means for urging said nose ends toward one another,
   a seal ring sized to be received between said nose ends, opposing surfaces of said ring and said coupled assembly defining an interface in which a gas may collect, said ring disposed between said interface and an interior of said coupled assembly;
   normally closed apertures connecting said interface and said interior in normally closed gas flow communication, said apertures responsive to a pressure drop within said interior to open said gas flow communication to thereby relieve a pressure differential between said interface and said interior, said apertures including at least one aperture extending through a radial dimension of said seal ring and connecting said interface and said interior in gas flow communication, said ring selected to have an axial dimension greater than said predetermined distance, said ring disposed within said nose ends urging against said ring, aperture defining surfaces of said ring resiliently deformed into face-to-face aperture closing contact in at least partial response to said urging, said ring further selected for pressure of a gas within said interface to act against said urging to open said aperture in response to a pressure drop within said interior.

6. A coupling assembly according to claim 5 wherein said ring is formed of material permeable to at least certain pressurized gases.

* * * * *